United States Patent

Tertinek et al.

[11] 3,931,748
[45] Jan. 13, 1976

[54] ADJUSTABLE GEAR ENCLOSURE FOR MIXER PINION AND BULL GEARS

[76] Inventors: Christian T. Tertinek, 3301 Cheshire Road, Canandaigua, N.Y. 14424; Alan J. Stone, P.O. Box 354, Honeoye, N.Y. 14471

[22] Filed: June 24, 1974

[21] Appl. No.: 482,652

[52] U.S. Cl. .................. 74/606 R; 74/397; 74/467; 184/6.12; 259/145; 308/245
[51] Int. Cl.² .................................. F16H 57/02
[58] Field of Search ............ 259/171, 178 R, 178 A, 259/179; 51/177; 74/421, 395, 606 R, 606 A, 396, 397, 401, 406, 409, 608, 609, 611, 467; 184/6.12, 6.19, 6.27; 308/245

[56] References Cited
UNITED STATES PATENTS

| | | | |
|---|---|---|---|
| 1,036,683 | 8/1912 | Mueller | 259/178 R |
| 1,526,333 | 2/1925 | Gilbert | 74/397 |
| 1,708,947 | 4/1929 | Jaeger | 259/178 R |
| 2,444,734 | 7/1948 | Gillett | 74/397 X |
| 2,590,675 | 3/1952 | Bottorff | 74/397 X |
| 2,775,903 | 1/1957 | Reed | 74/397 |
| 2,906,137 | 9/1959 | Bade | 74/421 R |
| 2,974,538 | 3/1961 | Jennings | 74/421 R |
| 3,100,064 | 8/1963 | Kacena | 259/171 X |
| 3,145,582 | 8/1964 | Wagner | 74/606 |
| 3,576,142 | 4/1971 | Matthews | 74/606 R |

*Primary Examiner*—Richard C. Pinkham
*Assistant Examiner*—Arnold W. Kramer

[57] ABSTRACT

A portable material treating device having conventional power, supporting, and treating means is provided with a novel sealed enclosure for the gearing unit between the power source and the driven treating device. The sealed enclosure for the gearing unit may be constructed to accommodate various horsepower sizes of gas or electric power sources with two embodiments being disclosed and provides for alignment and backlash adjustment between the gears of the gearing unit by adjustment of the enclosure. A lubricant fitting may be provided whereby the bottom of the sealed enclosure acts as a lubricant sump.

2 Claims, 4 Drawing Figures

ADJUSTABLE GEAR ENCLOSURE FOR MIXER PINION AND BULL GEARS

BACKGROUND OF THE INVENTION

The Jaeger (No. 1,708,947, issued Apr. 16, 1929) patent discloses "ordinary gearing in a case 24". The Graham (No.1,780,973, issued Nov. 11, 1930) and Wineman (No. 1,924,582, issued Aug. 29, 1933) patents disclose internal and external gearing and shafting. The Short patent (No. 2,214,485, issued Sept. 10, 1940) discloses a lubricant recirculated by a gaseous spray arrangement. In the Bade patent (No. 2,952,165, issued Sept. 13, 1960) a one-piece housing is disclosed as constructed to allow "substituting other gears and/or shafts without removing the gear reducer from the driven machine". Coutant (No. 3,133,452, issued May 19, 1964) discloses a special, internally mounted, key locking arrangement.

SUMMARY OF THE INVENTION

Among the objects and advantages of our invention are the following:

1. To provide an enclosure for a sealed gearing arrangement wherein part of the enclosure for the sealed gears may be moved sideways to obtain proper gear alignment and gear backlash.

2. To further provide a sealable and removble panel having an exterior grease fitting and a cap mounted on said panel to provide the dual function of providing access for the proper alignment we have noted in (1), above, and to connect with further lubrication means on the interior side of said removable panel.

3. In furtherance of the above, solid and stable connecting means are provided to secure all parts together, other than the sideways shifting parts to insure proper alignment of the entire device.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
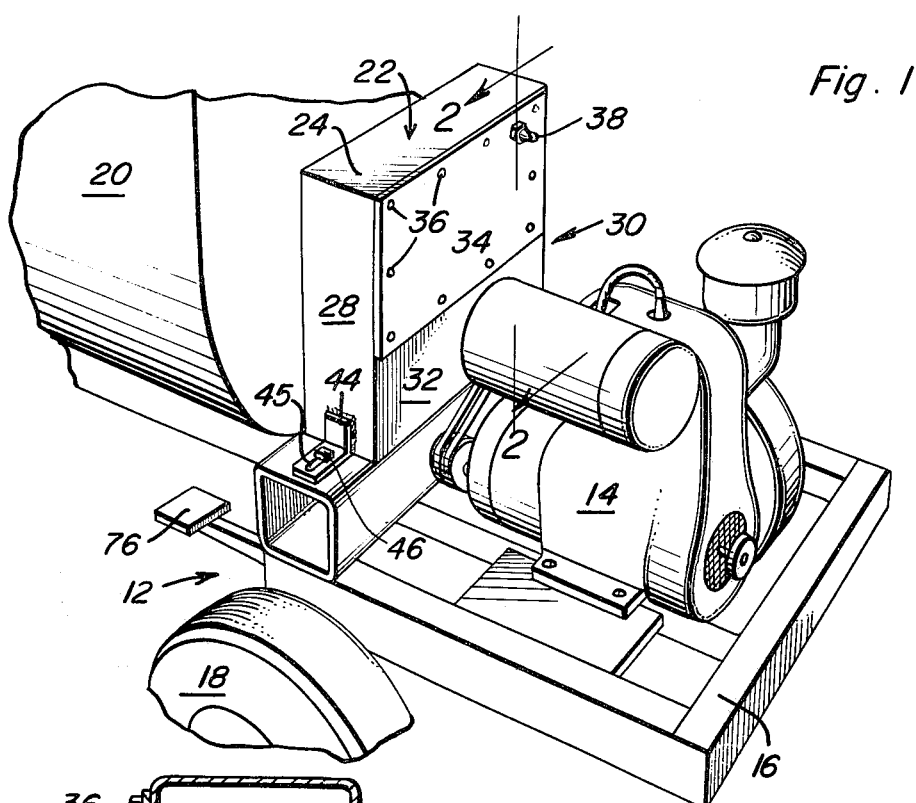
FIG. 1 is a fragmental perspective view of the portable mixer, with parts broken away and illustrating the position of the gear enclosure.

In the drawings, a portable mortar or plaster mixer is disclosed and includes a wheeled support generally referred to by reference numeral 12. The power source, which may be gas or electric, is denoted by 14, and 16 indicates part of the underlying supporting framework supported by wheel means (only one being partially illustrated) at 18. The material mixing chamber 20 of the device includes a mixing paddle (not shown) drivingly connected to said power source 14 by a sealed gearing unit 22.

Unit 22 includes an enclosure or housing 30 which has generally horizontally arranged top and bottom walls 24 and 26 with vertically arranged front, rear, and side walls 32, 42 and 28 completing the sealed enclosure or housing 30 with the lower portions of the vertical walls combining with the bottom wall 26 to provide a sump 48 for lubricant.

Front wall 32 has a removable panel 34 sealed (by coating and/or sealing strips) and fastened to wall 32 by a plurality of fastening bolts 36.

Panel 34 which covers an opening constituting approximately one-half of the square area of wall 32 has in an upper portion thereof a grease or lubrication fitting (with a cover-cap, or a self-sealing nipple, as desired) 38, which connects, when panel 34 is in sealing position on wall 32, with an interiorly located lubricating conduit means 40. Thus, when grease or other lubricant is inserted into 38, the lubricant will flow over the gearing and shafting enclosed within housing 30 and collect in sump 48.

Apertured angle plates 44, having elongated slots 45 for adjustment, are welded or otherwise affixed to walls 28 so that the housing 30 may be adjustably but rigidly attached to framework 16 by bolts 46 or similar fastening means.

Figure 4:
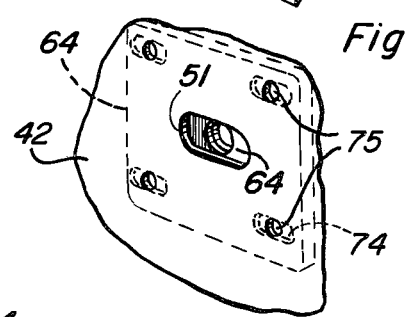
FIG. 4 is a partial, broken-away, perspective view of an interior portion of the gear enclosure.

In FIG. 4, 51 indicates an elongated slot to receive the inner end of paddle shaft 62, centrally of wall 42. Four apertures 75 surround slot 51 to receive means to fasten seal unit 64 to wall 42.

The drive train includes an input or pinion shaft 52 driven by belt drive from power source 14 (not shown in FIG. 2) and extends through a front sealed bearing unit 54 of the flange mounted type. The shaft 52 extends through spacer 56 and is keyed to pinion gear 58 and then extends into rear bearing unit 54 on wall 42. Bull gear 60 is aligned and meshes with pinion gear 58. Bull gear 60 is suitably fastened to the end of output shaft 62 which is the paddle shaft of the mixer and extends through slot 51 in wall 42 and a seal and bearing unit 64 having paired seals 71–72, and grease fitting 73. Output shaft 62 passes on to the mixing paddle in the treating chamber 20 (not shown in FIG. 2) in a conventional manner. The slots 45 in 44, 74 in 64 (mating with holes 75 in wall 42), and slot 51 in 42, permit the housing 30, bull gear 60 and pinion gear 58 to be adjusted to maintain proper alignment and backlash.

Figure 2:
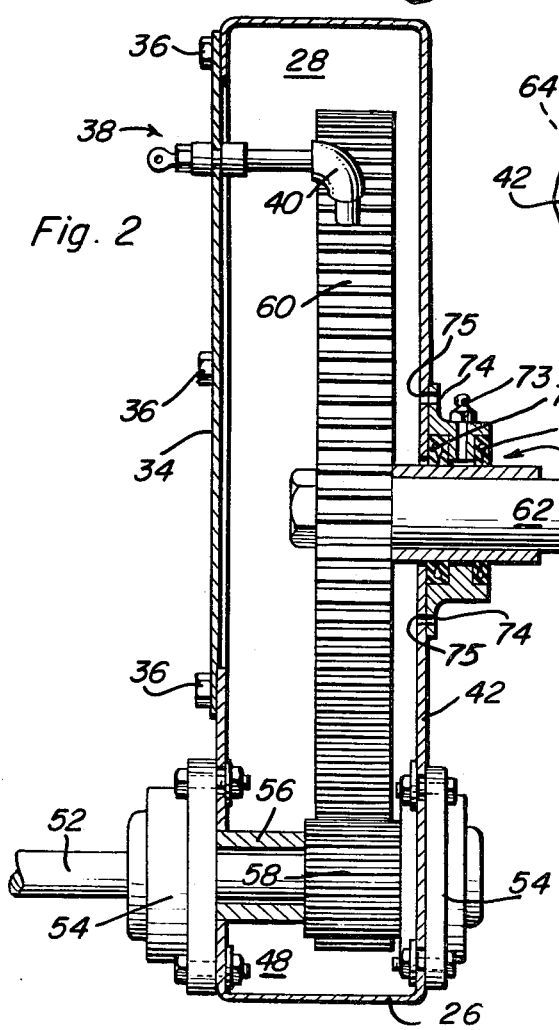
FIG. 2 is a sectional view, on an enlarged scale, taken approximately along the line 2—2 of FIG. 1.
Figure 3:
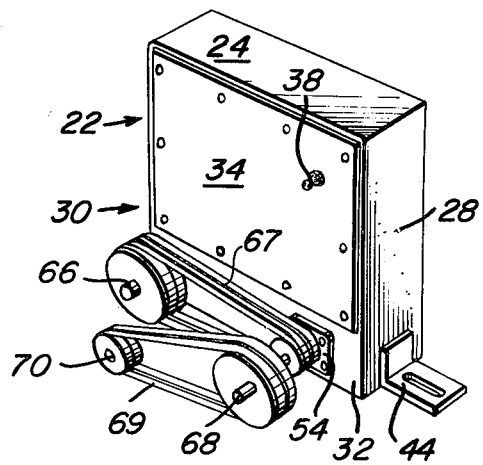
FIG. 3 is a perspective view of a modified sealed gear unit, for use with a belt drive means powered by an electric motor.

In the FIG. 3 belt drive modification, the input or pinion shaft 66 passes into unit 22 in the lower left hand corner in the same manner as shaft 52 is associated with the lower right hand corner in FIG. 2. An idler shaft 68 is supported at the lower right hand corner and is drivingly connected to pinion shaft 66 by a double V-belt drive 67. The idler shaft 68 is driven from electric motor output shaft 70 by a similar V-belt drive 69. The reduction provided by the belt drive in FIG. 3 enables the output speed of an electric motor which is about three times that of a gasoline engine to be reduced.

In use, clutch 76 is depressed, power source 14 is started, and once running smoothly, clutch 76 is released allowing the power to flow from 14 to input shaft 52 by belt or chain drive, through sealed gear unit 22, output shaft 62 to the mixer paddle in the treating chamber 20. Daily lubrication is recommended via fitting 38. Should the gearing or shafting interiorly of 22 need attention, removable panel 34 provides ready access. To stop the device, clutch 76 is again depressed and the power source 14 shut down. When an electric motor is used, power is transmitted through the belt drives and pulleys shown in FIG. 3 to the pinion shaft 66.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In a portable mixing device including a wheeled support frame, a mixing chamber supported from said frame and having a horizontally disposed paddle shaft projecting therefrom with a bull gear connected thereto, a power device supported from said frame and having a drive shaft drivingly connected thereto, said drive shaft having a drive pinion gear thereon in meshing engagement with the bull gear for driving the paddle shaft from the power device, that improvement comprising an enclosure for said pinion gear and bull gear comprising a pair of vertical, spaced front and rear walls rigidly interconnected by vertical side walls and horizontal top and bottom walls with the front wall disposed adjacent the power device, a bearing assembly mounted on each of said front and rear walls adjacent their juncture with the bottom wall and one of the side walls, said drive shaft extending through and being journaled by said bearing units with the pinion gear disposed between the front and rear walls, said bearing units being fixedly, non-adjustably and detachably mounted on the front and rear walls, a spacer on said drive shaft between the pinion gear and one of said bearing units to orient the pinion gear between the front and rear walls, said rear wall having a centrally disposed slot receiving said paddle shaft, a seal unit encircling said paddle shaft, said seal unit including slot means therein for adjustable mounting of the seal means on the rear wall to enable the enclosure to be shifted laterally of the rotational axis of the paddle shaft, said enclosure including laterally extending slotted mounting brackets receiving fastening members for mounting the enclosure on the frame for lateral adjustment thereby enabling the rotational axis of the drive shaft, the pinion gear mounted thereon and the enclosure which journals the drive shaft to be laterally adjusted in relation to the stationary axis of the paddle shaft and bull gear thereon to provide alignment and backlash adjustment between the gears.

2. The structure as defined in claim 1 wherein said front wall is provided with a removably mounted inspection and access plate of a size to enable removal of the bull gear when detached from the paddle shaft, and a lubrication fitting mounted on said removable plate and including a conduit for discharging lubricant on the bull gear.

* * * * *